(12) United States Patent
Delaere et al.

(10) Patent No.: US 7,073,663 B2
(45) Date of Patent: *Jul. 11, 2006

(54) SLEEVELESS TRANSPARENT POLYPROPYLENE OPTICAL DISC STORAGE UNITS

(75) Inventors: Marc Delaere, Lochristi (BE); Rajinish Batlaw, Spartanburg, SC (US); William S. Parks, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/215,724

(22) Filed: Aug. 10, 2002

(65) Prior Publication Data

US 2004/0026276 A1   Feb. 12, 2004

(51) Int. Cl.
  *B65D 85/30* (2006.01)
(52) U.S. Cl. .................... 206/308.1; 206/311
(58) Field of Classification Search ............. 206/308.1, 206/309–313, 493, 459.5, 449, 232, 387.1, 206/308.2, 472, 776; 402/73; 281/15.1
See application file for complete search history.

(56) References Cited

U.S. PATENT DOCUMENTS

| | | | | |
|---|---|---|---|---|
| 4,566,590 A | * | 1/1986 | Manning et al. ............ 206/232 |
| 4,829,691 A | * | 5/1989 | Manjos et al. ................ 40/661 |
| 4,998,985 A | * | 3/1991 | Sankey .................... 206/387.1 |
| 5,263,579 A | * | 11/1993 | Blackman .................... 206/232 |
| 5,415,288 A | * | 5/1995 | Ozaki ..................... 206/387.1 |
| 5,515,967 A | * | 5/1996 | Fitzsimmons et al. ... 206/307.1 |
| 5,731,474 A | | 3/1998 | Scrivens et al. |
| 5,829,584 A | * | 11/1998 | Raucci, Jr. ............... 206/308.1 |
| 5,931,294 A | * | 8/1999 | Weingarden et al. .... 206/308.1 |
| 5,996,788 A | * | 12/1999 | Belden et al. .............. 206/310 |
| 6,029,848 A | * | 2/2000 | Cha et al. .................... 220/837 |
| 6,047,819 A | * | 4/2000 | Borst et al. ................. 206/232 |
| 6,165,391 A | | 12/2000 | Vedamuttu |
| 6,196,384 B1 | * | 3/2001 | Belden, Jr. ............... 206/308.1 |
| 6,202,335 B1 | * | 3/2001 | Shelton et al. ........... 40/661.06 |
| 6,206,186 B1 | * | 3/2001 | Cerda-Vilaplana et al. ....................... 206/308.1 |
| 6,279,739 B1 | * | 8/2001 | Moore et al. ............... 206/312 |
| 6,357,584 B1 | * | 3/2002 | Simpson .................. 206/308.1 |
| 6,405,860 B1 | * | 6/2002 | Raucci, Jr. ............... 206/308.1 |
| 6,454,090 B1 | * | 9/2002 | Flores et al. ............. 206/308.1 |
| 6,764,242 B1 | * | 7/2004 | Karten et al. .................. 402/73 |

* cited by examiner

*Primary Examiner*—Shian T. Luong
(74) *Attorney, Agent, or Firm*—Terry T. Moyer; John E. Vick, Jr.

(57) ABSTRACT

Novel optical disc storage units comprising transparent polypropylene are provided. Such storage units exhibit sufficient impact resistance to protect the target disc and sufficient clarity that any informational literature may be placed entirely within the storage unit and easily viewed and read through the walls thereof without impediment. Furthermore, the target storage unit must also include a spine section of sufficient width to permit a section of the informational literature to be placed internally thereon and viewed and easily read (such as, for example, the title and accompanying language describing the target disc placed therein) substantially without impediment as well. Specific novel storage units, in addition to these necessarily transparent walls and spine portions, are also possible to maximize the benefits of the transparent properties thereof.

2 Claims, 2 Drawing Sheets

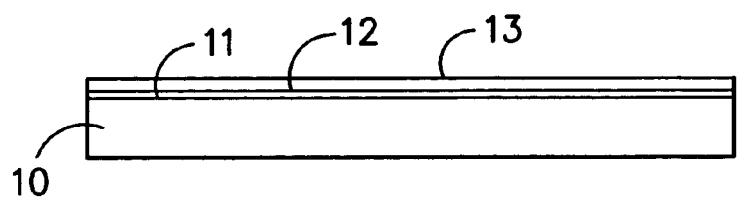
FIG. -1-
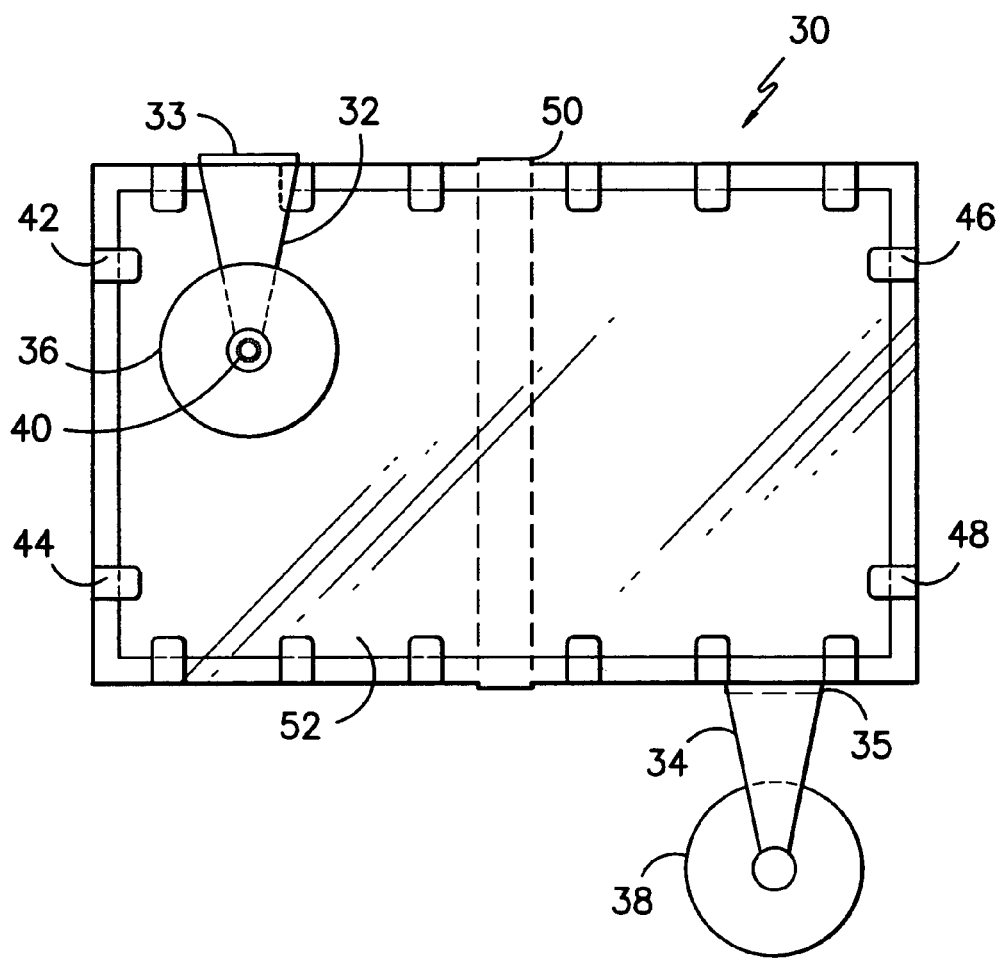
FIG. -2-

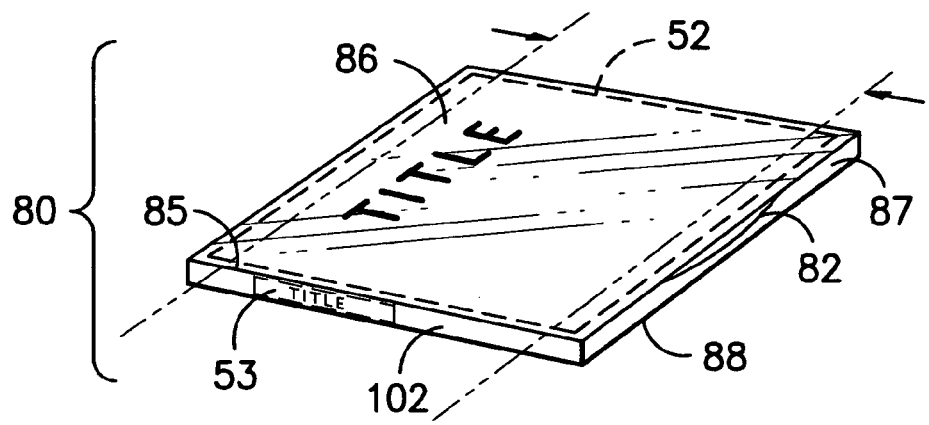
FIG. -3-
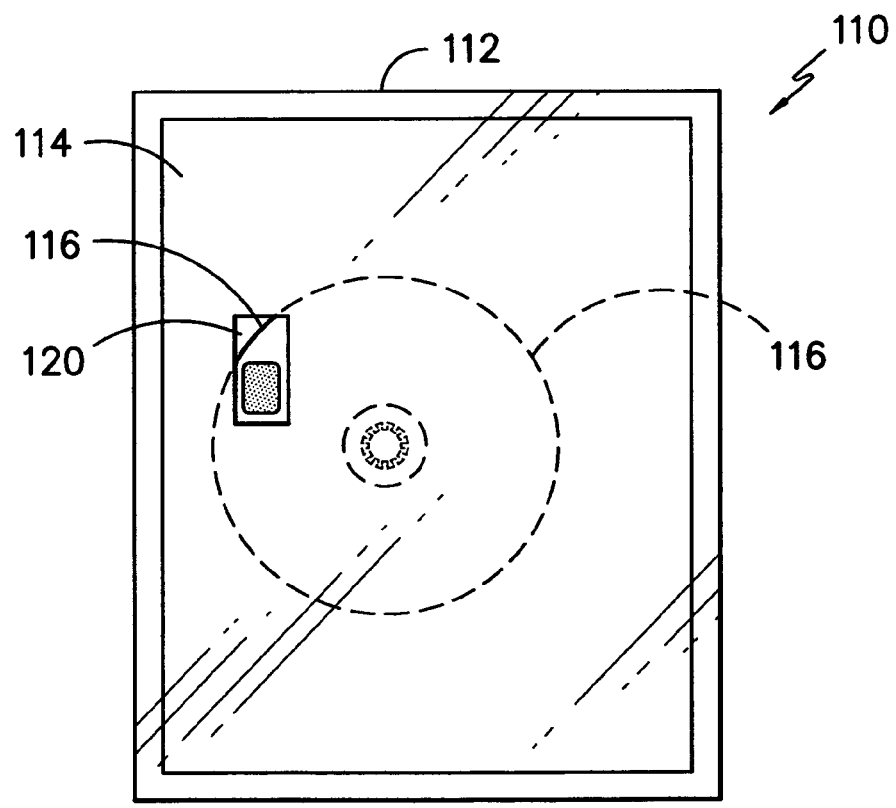
FIG. -4-

SLEEVELESS TRANSPARENT POLYPROPYLENE OPTICAL DISC STORAGE UNITS

FIELD OF THE INVENTION

This invention relates to novel optical disc storage units comprising transparent polypropylene. Such storage units exhibit sufficient impact resistance to protect the target disc and sufficient clarity that any informational literature may be placed entirely within the storage unit and easily viewed and read through the walls thereof without impediment. Furthermore, the target storage unit must also include a spine section of sufficient width to permit a section of the informational literature to be placed internally thereon and viewed and easily read (such as, for example, the title and accompanying language describing the target disc placed therein) substantially without impediment as well. Specific novel storage units, in addition to these necessarily transparent walls and spine portions, are also possible to maximize the benefits of the transparent properties thereof.

DISCUSSION OF THE PRIOR ART

Optical data storage discs, such as compact discs (CDs), digital video discs (DVDs), and compact discs having read-only memory (CD-ROMs), have been utilized within the entertainment and computer field for a number of years, with DVDs recently entering the market with much higher amounts of available encoded information for more impressive video results. Such discs generally comprise a layer of plastic material, on one side of which is formed a micro-relief pattern in the form of indentations which comprise an encoded information signal. This information-containing side exhibiting such a micro-relief pattern is then provided with a lacquer-protected metallized reflective layer to permit reading via a laser sensor. DVDs may contain more than one such layer of micro-relief patterns thus providing increased amount of information. Such DVDs exhibit several formats but always comprise two substrates, each formed with at least one information layer, that are secured to one another. Furthermore, the lacquered portion of the disc, generally being solely on one side, usually is provided with visible printed information for identification, informational, and/or aesthetic purposes to the user. Standard and particular production methods for such discs are disclosed within such documents as U.S. Pat. No. 6,165,391 and European Patent EP 0608358B1 (including the production of discs including holographic images embossed in the lacquer forming the protective layer for the metallized surface in order for the micro-relief pattern to define such an holographic image).

Such optical discs are normally formed from polycarbonate material which is injected into an injection molding machine in which a stamper is present, the stamper forming the pattern of indentations in the subsequently formed disc to provide the encoded signal. Other techniques utilize compression molding with a specific mold to provide the encoded signals therein.

The discs may thus include certain holographic images on the surface as well as different additives within the plastic layer, all not detrimental to the operation of the target disc itself which can be utilized for anti-counterfeit purposes. However, such measures are generally available only upon removal from storage units (primarily for DVDs which are packaged mostly within opaque black storage units or, if clear polypropylene is utilized, including informational literature on the outside of the storage unit within clear sleeves, which in turn prevents viewing of the internal portion of the storage unit as well). There is thus a desire to provide such anti-counterfeit or authentication benefits without the need to open a target unit.

Furthermore, storage units for such discs have predominantly been either polystyrene in nature (for CDs and CD-ROMs) or black (and thus opaque) polypropylene (for DVDs). Polystyrene is generally very clear and has become commonplace in terms of CD and CD-ROM storage; however, such material has proven to be less than reliable in terms of long-term usage. Polystyrene is generally susceptible to breakage easily, requires a two piece case to provide a hinge, and is more expensive than polyolefins. Opaque polypropylene prevents the ability to view the actual disc prior to opening of the unit itself. Polypropylene withstands certain forces better than polystyrene (such as accidental drops, colliding with solid objects, etc.), and is cheaper than such an expensive material. Furthermore, transparent polypropylene has been utilized to a certain degree as well to reduce costs in other ways. For example, DVDs generally include an attached sleeve to the target storage unit of transparent thin film in order to place an identifying publication therein. Such a thin film sleeve increases costs to such a degree that certain storage unit producers have noted the ability to remove the need for such a costly thin film sleeve and move the published identification papers within the storage unit itself. Thus, it has been determined that with sufficient transparency, the identifying publications can be viewed without opening the box itself. Furthermore, with regard to the anti-counterfeit measures (for example, holographs present on the surface of a target disc), it has been determined that removal of sleeves (or jackets) and moving away from opaque, black polypropylene can accord the desired characteristics while not requiring first opening a target storage unit. However, it has also been found that this benefit is available only with a completely transparent storage unit exhibiting sufficient clarity throughout that a sleeve (or jacket) for certain informational literature on the outside of the unit can be avoided. This requirement has not been provided to date, particularly with a spine portion of a target storage unit that is sufficiently transparent throughout to provide proper viewing and reading therethrough of the necessary informational literature for library storage purposes.

Unfortunately, even with such previous developments in storage unit design and production as all-transparent boxes, there has been a lack of maximization of such a development, particularly in terms of reducing costs associated with informational literature. In the past, booklets of limited size have been produced for informational purposes for the user. Such booklets were placed within the storage unit but normally required removal from the storage unit itself prior to reading. Such booklets also cost a great deal of money to produce and pack. There thus exists the need to maximize the benefits of having the full published information documentation within the inside of the target disc storage unit. To date, for example, there still exists a standard configuration wherein the discs as stored remain within the storage unit and thus act as obstacles to reading the provided printed information literature accompanying the disc itself. To date, there has been no discussion or fair suggestion on how best to maximize such a limited design in order to maximize the benefits of utilizing transparent polyolefin storage unit materials themselves. In particular, the ability to provide all polypropylene storage units (and the accompanying benefits) have heretofore gone unexplored. Thus, no mention of the ability to bring all informational literature within such a storage unit has been accomplished, particularly where all of the transparent parts of the polypropylene storage unit have been properly designed to permit complete, unimpeded viewing of the informational literature within the unit itself when in the closed position. Thus, such a completely transparent polypropylene storage unit with all informational literature placed internally and easily readable while such a unit is closed has not been accorded these particular industries to date.

OBJECTS AND SUMMARY OF THE INVENTION

It is thus an object of this invention to provide a completely polypropylene optical disc storage unit with all informational literature present within and easily viewed and readable while the unit is closed. Another object is to provide a living hinged storage unit (for simplified manufacturing) with a spine component of sufficient width to permit an area of informational literature for, as one example, a title for the particular disc itself, wherein the spine is essentially free from any refractive impediments in the area in which the text of the informational literature is present. Yet another object of the invention is to provide a simultaneous manner of efficient storage of discs and improved access to provided informational literature accompanying such discs.

Accordingly, this invention encompasses a transparent polypropylene-containing storage unit having a first side and a second side separated by at least one living hinge and at least one spine portion, wherein said spine portion is substantially free from any refractive impediments (e.g., reinforcements and polymer injection points), wherein when said storage unit is in its closed position and including informational literature therein, said informational literature can be viewed and read through the walls and spine of said storage unit. Also encompassed within this invention is a transparent polypropylene-containing storage unit having a first side and a second side separated by at least one living hinge and at least one spine portion having a top peripheral edge and a bottom peripheral edge, wherein said spine portion comprises a top end which extends from said top peripheral edge of said spine portion downward a distance equal to at most 5% of the height of the entire spine portion to either a defined or imaginary line parallel to said top peripheral edge, wherein said spine portion comprises a bottom end which extends from the bottom peripheral edge of said spine portion upward a distance equal to at most 5% of the height of the entire spine portion to either a defined or imaginary line parallel to said bottom peripheral edge, with the remainder of said spine portion constituting a middle area, wherein said middle area is free from any refracting impediments, wherein when said storage unit is in its closed position and including informational literature therein, said informational literature can be viewed and read through the walls and said middle area of said spine of said storage unit. Further encompassed within this invention is either of the same storage units defined above, which further includes at least one peripheral edge, as noted above including at least one means for holding said optical disc storage, said at least one disc holding means being attached either permanently or temporarily to said at least one peripheral edge via a hinge, wherein said optical disc may be maneuvered outside of said storage unit while simultaneously being held within said discs holding means which in turn remains attached to said at least one peripheral edge of said storage unit.

DESCRIPTION OF THE INVENTION

Such a novel configuration as defined above solves a number of different problems, mostly associated with cost issues, to provide a relatively inexpensive, yet effective storage unit for optical disc articles. Such optical disc articles are generally stored within thermoplastic containers that, in the past, have been, at least temporarily, aesthetically pleasing and protective. However, past compact disc (CD) storage units have utilized polystyrene which cannot be injected molded into living hinge arrangements, is highly susceptible to breakage from typical use situations, not to mention mere mishandling and/or dropping, and is relatively expensive both from a base polymer standpoint and a labor intensive perspective. More recent boxes for optical discs (including, without limitation, compact discs, CD-ROM, CD-R, DVD, and the like articles) have been stored in a variety of thermoplastic containers, both when placed on a salesperson's shelf, as well as within a user's home or office. Some polypropylene, black (the majority of DVD) and clarified (much fewer DVDs and very few CD, CD-ROM, and CD-R) has been utilized in certain situations, but none which include "book" containers that include unimpeded spine portions for viewing of informational material therethrough. In fact, transparent has proven, in the past, to be less economically attractive than black polypropylene due to the requirement that a clear jacket be utilized for both types of containers for certain informational literature on the outside of the container, but still integrally a part of the entire storage unit (primarily because clarity is not to a low enough level to permit full viewing and reading of anything within the target storage unit. Haziness creates refraction problems such that definition in printed matter placed inside such a unit is lacking from a reader's perspective to too great an extent for current use of all transparent PP storage units for such a purpose. Aesthetically, as well, such lack of sufficient clarity creates a storage unit that appears less than stellar, particularly when coupled with optical discs that are generally high-end purchases and thus require aesthetics of the highest quality as well. Thus, the utilization of a clear sleeve or jacket is prevalent to provide such aesthetically pleasing appearances to optical disc storage units, not to mention to facilitate locating and reading titles, and the like. As noted above, however, there is a distinct desire and/or need to avoid the costs and labor required to omit the need for such a clear sleeve or jacket component. Furthermore, most informational literature is today printed in booklet form, folded, and placed within a securing system on the internal portion of such a polypropylene-based storage unit. The costs involved with such a booklet is relatively high as well, not to mention the requirement that the user actually remove the informational booklet in order to read such material. The above defined novel configuration thus permits utilization of all transparent polypropylene for placement of all informational material within the target storage unit with the ability to place greater amounts of information on such material available and directly viewable once the storage unit is opened.

Furthermore, heretofore unexplored within this industry is the need to provide an unimpeded spine to facilitate viewing of any informational literature present within the storage unit within that area. As is well known, optical disc storage units typically include clear spines in order to permit a title to be read while a plethora of such discs are kept in a library type formation. However, such clear spines have either been provided via the aforementioned easily breakable polystyrene containers (for CD and CD-ROM articles, for example)

that further are not able to include a living hinge. As well, standard black (opaque) polypropylene and, to a much lesser extent in number used today, clear polypropylene, clear jackets are attached to the storage unit for inclusion of such informational material and thus to facilitate viewing of the title (and other desired information) on the spine for the aforementioned library configuration. Cost and complexity of manufacturing are both issues confronted with such jacket sleeves and their present necessity to provide the ultimate user (if not the salesperson) a manner of storing and displaying his optical disc library in an arrangement that facilitates locating desired optical discs quickly and conveniently. Thus, the inventive optical disc storage units noted above overcome these cost and manufacturing complexity problems as well.

As used for this specific invention, the term "refractive impediments" is intended to encompass a range of possibilities. Initially, it is important to note that with any clear polymer, any modification at the surface or within the polymer itself can create refraction differences between the polymer and the modification site, thereby causing distortions in appearance of any articles present on the other side of the clear polymer from the viewer. The general problem has thus been noticed and avoided within the above-defined invention by removing refractive impediments in the spine (the area used for quick identification and location of target discs in a library set-up). Thus, the term "refractive impediments", to one extreme, encompasses any reinforcements (such as are typical within optical disc storage units to impart improved flexural modulus and other strength characteristics to the unit itself) or polypropylene injection points. Injection molding is the typical method of producing polypropylene-containing articles of this type, e.g., boxes. As is generally and well known within the polypropylene art, injection molding is the most convenient and cost-effective method of producing such articles. The molten polymer is injected into a mold through a single point and the molten polymer then flows across and/or within the mold evenly to form the desired shape, and ultimately, article, upon cooling within the mold itself. As most optical storage units made from polypropylene have been designed symmetrically, the injection point or points are usually located in the exact center of the mold to provide the most even distribution of polymer. This is usually within the area that ultimately constitutes the spine portion of the target storage unit. Thus, to reiterate, at one extreme of the range of possibilities encompassing the term "no refractive impediments", no injection points or reinforcements will be located within the spine portion of the target storage (either externally or internally). To the other extreme, the term "refractive impediments" may include the presence of injection points, as well as reinforcements (again, either externally or internally), within the target area; however, in order to avoid the refraction problems, such points or reinforcements can either be small enough not to impede the view of any informational literature pressed against the spine (internally within the storage unit), or clarified to such a degree that the refraction index of the polymer and such points or reinforcements are essentially the same (thus no difference in appearance is noticed viewing any informational literature therethrough).

Furthermore, there can be, in one preferred embodiment, a top end of the spine portion and a bottom end of the spine portion, within which any number of reinforcement and/or injection points may be present. Such ends are generally within the areas so close to the top and bottom of the spine portion that the informational literature in such areas is generally not utilized to any necessary degree. Thus, there exists the ability to leave a middle area between the top and bottom ends of the spine portion within which all of the desired informational material (title, description, etc.) may be placed without any impediment to viewing or reading. In such a situation, the user can, as above, still utilize the target storage unit in a library configuration to facilitate quick location upon demand. The top end in such a scenario is thus an area measured from the top peripheral edge of the spine portion downward to a line parallel with said top peripheral edge. Such a line may be clearly demarcated or imaginary, depending on the molder's needs or desires; however, at most such a line should be a distance equal to at most 5% of the entire height of the spine portion itself. The bottom end is thus the same in structure and configuration, except that the line and measurement is made from the bottom peripheral edge of the spine portion. Thus, the remaining middle area leaves sufficient room for any informational literature placed in contact with the internal spine portion (in relation to the storage unit) to provide the desired material for viewing and/or reading by the user. The distance of the line from either the top or bottom end that in turn defines the middle area of the spine portion is preferably less than 5% of the height of the spine portion, and should be as low as possible. For a standard storage unit, generally 7.5 inches in height, it is preferable that such a distance be at most 0.375 inches, more preferably 0.25 inches, and most preferably at most 0.15 inches. Again, this permits a clear, unimpeded view of any informational literature placed inside the storage unit and in contact with the internal spine portion which thus permits complete removal of any need to provide a clear jacket for such a purpose.

The utilization of a holding means (such as a rosette, a tray, or like component) which is attached to the peripheral edge of the storage unit, preferably on either of the first or second sides thereof, is important to permit the manufacturer and distributor to avoid the costs involved with providing informational literature in booklet form. Such a peripheral edge attachment permits moving of the holding means outside the storage unit when opened. Thus, a completely flat sheet containing all necessary information can be provided and placed within the target storage unit. Moving the holding means thus permits the user to view the entire contents of such a sheet without removing it itself from the storage unit first. Generally, booklets of informational literature are held in place by brackets; with such brackets the booklet is not designed to open unless removed therefrom. Furthermore, if any portion of such a booklet is present outside any such bracket, the target storage unit is generally difficult to close. In any event, the problems associated with such booklets, whether cost, convenience, storage unit closure, etc., have dictated a desire to avoid such specific informational literature configurations. The movable disc holding means of this invention thus provides the basis for avoiding such noticeable problems. Again, a full sheet, rather than a booklet, can be utilized and the side of such a sheet placed against the internal portion of the storage unit can be easily viewed and read when the unit is closed and the remainder can be easily viewed and read when the unit opened and the disc holding means is moved outside the unit as well.

Holographic images have been produced within the micro-relief pattern(s) of optical discs in the protective lacquer in order to provide authentication or anti-counterfeiting techniques. In the past, however, such images required first removing the target disc from its storage unit prior to viewing such an anti-counterfeit marking device.

Thus, the ability to provide a simpler method of counterfeit detection via transparent storage unit materials, and configuration of the particular storage unit itself, has not been previously investigated. With such a transparent storage unit, the aforementioned benefits of moving the identification literature within the case provides some difficulty in determining proper views of the authenticity image (herein defined as a holographic image, a bar-code, or other like imaging effect that indicates uniqueness of source). If the literature is too large in size and thus only permits viewing at the peripheral edges (as with the other preferred embodiment noted above), then either openings may be provided in the literature for proper viewing of the authenticity image at specified areas of the target disc, or the authenticity image may also be placed on the peripheral edges for proper viewing and analysis by the target audience.

The transparency of the storage unit is of utmost importance for permitting both readability of informational literature and, if desired, authenticity detection (such as, for example, through the presence of holographs on the target disc). In such a manner, the ability to read informational literature and to determine counterfeit discs while the storage unit is either closed, sealed, or both, is not only facilitated, but also permitted. With promotional literature material utilized, either within a sleeve, or placed within the storage unit itself, generally such paper material is placed in such a way as to prevent easy view of the surface of the target disc. Thus, there is a need to either provide a cut-out pattern within the promotional material or smaller material in general, to permit viewing of the surface of the target disc if such anti-counterfeit (authenticity) measures are desired. The transparency of the storage unit material thus accords the ability to actually view the surface without removing the target disc from such a case.

For this purpose, polypropylene is most highly desired, in particular clarified polypropylene (cPP). Any standard clarifying agent may be utilized for this purpose, however, highly preferred are those of the substituted benzylidene sorbitol type, most highly preferred being 3,4-dimethyldibenzylidene sorbitol (available from Milliken & Company under the tradename MILLAD® 3988 (MILLAD® 3940 may also be utilized; however, due to plate-out and organoleptic issues, such an additive is not as highly desired for such a purpose). material in the reaction. Such an additive is indicated within U.S. Pat. No. 5,731,474 to Scrivens et al., for example, and is generally added to target polypropylene in an amount of from about 0.01 to about 2 percent by weight, preferably about 0.1 to about 1 percent by weight, based upon the total weight of the composition may be provided.

The cPP may be of any type that can be clarified to the levels needed for ease in viewing and reading any informational literature within the storage unit. The thickness of the walls and spine portion should be from about 0.1 to about 100 mils, with a range of from 5 to about 50 mils potentially preferred for both strength and transparency purposes. Such cPP thus may be PP homopolymer (HP), random copolymer PP (RCP) blended with other polyolefins or other types of comonomers as noted below (prereferably ethylenically unsaturated comonomers), as well as syndiotactic PP (although such a PP is more costly than the others). Generally, the comonomers, if present, constitute a minor amount, e.g., about 10 percent or less or even about 5 percent or less, of the entire polyolefin, based upon the total weight of the polyolefin. Such comonomers may serve to assist in clarity improvement of the polyolefin, or they may function to improve other properties of the polymer. Examples include acrylic acid and vinyl acetate, etc. Such PP can thus be present alone or blended with various thermoplastics, such as, without limitation, aliphatic monoolefins or other monomers containing 2 to about 6 carbon atoms which have an average molecular weight of from about 10,000 to about 2,000,000, preferably from about 30,000 to about 300,000, such as polyethylene, linear low density polyethylene, crystalline ethylenepropylene copolymer, poly(1-butene), 1-hexene, 1-octene, vinyl cyclohexane, and polymethylpentene, again, as long as the clarity is low enough for the objects described and discussed above.

The preferred polypropylene composition can be obtained by adding a specific amount of the substituted dibenzylidene sorbitol directly to the polypropylene (or copolymer), and merely mixing them by an suitable means. Alternatively, a concentrate containing as much as about 20 percent by weight of the additive in a polypropylene masterbatch may be prepared and be subsequently mixed with the resin. Furthermore, the clarifying additive (and other additives) may be present in any type of standard polyolefin additive form, including, without limitation, powder, prill, agglomerate, liquid suspension, and the like, particularly comprising dispersion aids such as polyolefin (e.g., polyethylene) waxes, stearate esters of glycerin, montan waxes, mineral oil, and the like. Basically, any form may be exhibited by such a combination or composition including such combination made from blending, agglomeration, compaction, and/or extrusion.

Other additives such as a transparent coloring agent or plasticizers (e.g., dioctyl phthalate, dibutyl phthalate, dioctyl sebacate, mineral oil, or dioctyl adipate), can be added to the composition of the present invention so long as they do not adversely affect the improvement of transparency of the product. It has been found that plasticizers such as those exemplified above may in fact aid in the improvement of the transparency by the di-acetal. In particular, it is further contemplated that certain organoleptic improvement additives be added for the purpose of reducing the migration of degraded benzaldehydes from reaching the surface of the desired article. The term "organoleptic improvement additive" is intended to encompass such compounds and formulations as antioxidants (to prevent degradation of both the polyolefin and possibly the target alditol derivatives present within such polyolefin), acid neutralizers (to prevent the ability of appreciable amounts of residual acids from attacking the alditol derivatives), and benzaldehyde scavengers (such as hydrazides, hydrazines, and the like, to prevent the migration of foul tasting and smelling benzaldehydes to the target polyolefin surface). Such compounds and formulations can be added in any amounts in order to provide such organoleptic improvements as needed. However, the amounts should not appreciably affect the haze results for the target polyolefin itself. Thus, lower amounts on the order of from about 20 ppm to about 2,000 ppm of the total polyolefin component are desired.

Polyolefin Formation and Testing

Transparent polypropylene optical disc storage units were produced comprising DMDBS clarifying agents sample random copolymer polypropylene (RCP) resins, as noted below. The polypropylene was produced dry blended in a Welex mixer at ~2000 rpm, extruded through a single screw extruder at 400–450° F., and pelletized. Accordingly, batches of target polypropylene were produced in accordance with the following table:

RANDOM COPOLYMER POLYPROPYLENE COMPOSITION TABLE

| Component | Amount |
| --- | --- |
| Polypropylene random copolymer flake (3% ethylene) (MF = 12) | 1000 g |
| Irganox ® 1010, Primary Antioxidant (from Ciba) | 500 ppm |
| Irgafos ® 168, Secondary Antioxidant (from Ciba) | 1000 ppm |
| Calcium Stearate, Acid Scavenger | 800 ppm |
| DMDBS | 2500 ppm |

The base resin (random copolymer, hereinafter "RCP") and all additives were weighed and then blended in a Welex mixer for 1 minute at about 1600 rpm. All samples were then melt compounded on a Killion single screw extruder at a ramped temperature from about 204° to 232° C. through four heating zones. The melt temperature upon exit of the extruder die was about 246° C. The screw had a diameter of 2.54 cm and a length/diameter ratio of 24:1. Upon melting the molten polymer was filtered through a 60 mesh (250 micron) screen. The target storage units of this polypropylene material were then made through extrusion into an Arburg 25 ton injection molder with the proper mold configuration. The molder was set at a temperature anywhere between 190 and 260° C., with a range of 190 to 240° C. preferred, most preferably from about 200 to 230° C. (for the Tables below, the standard temperature was 220; a # denotes a temperature 210, a ^ denotes a temperature of 200, and a @ denotes a temperature of 230). The storage units had dimensions of about 200 mm×200 mm×1.27 mm, and were made in a mold having a mirror finish. The mold cooling circulating water was controlled at a temperature of about 25° C.

The haze values were measured by ASTM Standard Test Method D1003-61 "Standard Test Method for Haze and Luminous Transmittance of Transparent Plastics" using a BYK Gardner XL-211 Hazemeter. Nucleation capabilities were measured as polymer recrystallization temperatures (which indicate the rate of polymer formation provided by the presence of the nucleating additive) by melting the target plaques, cooling the plaques at a rate of about 20° C./minute, and recording the temperature at which polymer re-formation occurs. The resultant haze of the product storage units were about 8.0%, a level of sufficient transparency to permit illumination of the optical discs stored therein for authenticity detection in accordance with the inventive methods.

The optical discs themselves may be of any standard composition, wherein at least one plastic layer is coated with at least one information layer, which is further coated with at least one metallized layer, and which is further coated with a lacquer layer. Preferably, the plastic layer is of a material having some compressibility, such as PERSPEX® (polymethyl methacrylate, or PUMA) and has a thickness between 5 mm and 20 mm.

The metal layer is preferably nickel, although any other reflective metal may be utilized. The lacquer is preferably a methacrylate. The general production methods are as noted above within U.S. Pat. No. 6,165,391, herein entirely incorporated by reference.

BRIEF DESCRIPTION OF THE DRAWINGS

The present invention will now be described in more detail by way of example only, with reference to the accompanying drawings wherein:

FIG. 1 is a cross-sectional view of a compact disc.

FIG. 2 is a top view of the inventive movable rosette arm storage unit configuration.

FIG. 3 is a partial aerial, partial side view of a preferred embodiment of a completely transparent polypropylene storage unit in its closed position with an unimpeded spine and side walls for complete viewing of informational literature placed therein.

FIG. 4 shows a method of viewing a disc through a transparent polypropylene storage unit to detect the identifying image on the surface of the target disc.

DETAILED DESCRIPTION OF THE DRAWINGS

Referring now to FIG. 1, an optical disc is shown which comprises a plastic substrate 10 normally formed from polycarbonate and including a peripheral edge 8 and an upper surface 11 having a pattern of pits formed therein which define a data recording. The pitted surface 11 is provided with a metallic film 12 so as to provide a light reflecting surface, the metallic layer 12 being covered by a protective layer of lacquer 13 which may be an ultraviolet light curable resin such as that sold under the trade mark RENGOLUX®.

The resin is normally applied to the disc by spin coating, i.e. the resin is applied to the disc at a position slightly radially inwardly from the radially innermost extremity of the metallized surface, the disc being rotated at speed, such that the resin flows towards the circumference of the disc, and is cured by exposure to ultraviolet light.

The manner in which the polycarbonate substrate 10 is formed is normally by injection molding. A metal plate known as a stamper having a surface formed with an information layer is placed in the cavity of an injection mould and polycarbonate material is injected into the mould.

The injection molding process produces a polycarbonate substrate bearing the information layer and having a substantially flat surface and even thickness, with maybe a variance of a few microns with the exception of the peripheral ridge 14 in the polycarbonate substrate which may be in the region of 50 microns thicker than the average thickness of the disc elsewhere.

FIG. 2 illustrates a desired structure of an inventive transparent cPP storage unit 30. Such a unit 30 includes movable arms 32, 34 which are attached to the unit 30 via living hinges 33, 35. Although such living hinges 33, 35 are preferred embodiments (since production of such a molded storage unit 30 is easier through a single mold), detachable hinges (not illustrated) may also be utilized. The discs 36, 38 are attached to the arms 32, 34 via individual rosettes 40 (other not illustrated). The moved arm 34 shows the ability to maneuver the particular disc 38 outside the unit 30 in order to read and/or view the desired promotional literature 52 which is held in place with brackets 42, 44, 46, 48 to the unit 30. The other arm 32 may also be moved in like fashion. The number of discs permitted in such a configuration may be as many as six with individual moving arms attached at each segment of the unit 30 separated by the spine hinge 50. Thus, the promotional literature 52 may be moved inside the unit 30 and easily read completely wither via movement of the individual arms 32, 34 or through the clarified wall of polypropylene on which the promotional literature rests (not illustrated).

FIG. 3 depicts one preferred non-limiting design for the inventive optical disc storage unit. In particular, a cPP storage unit 80 is provided including (here viewed in the closed position) a top flap 86 attached via a living hinge 85 and a recessed portion 87 having a bottom side 88. The disc 82 is present within the storage unit 80. Informational literature 52 is present within said storage unit 80 and in contact with said top flap 86 as well as spine informational literature 53 is present within said storage unit 80 and in contact with a spine portion 102. Furthermore, said spine portion 102 includes no internal or external reinforcements or injection points (not shown). In fact, the injection points (not shown) are present, in this embodiment, on the bottom side 88 of said recessed portion 87, thereby providing an unimpeded view of the informational literature 52 through each wall of said storage unit 80 and said spine portion 102. Alternatively, a more symmetrical storage unit may be utilized wherein any injection points may be reduced in size and/or moved to a location sufficiently distant from the middle of the spine portion, again to provide the needed unimpeded view of any informational literature placed completely within the unit itself. Any combination thereof, including patterns in like manner may be utilized as well for such a storage unit as long as the completely internally located informational literature is viewable and readable while said unit is in its closed position.

FIG. 4 thus depicts another preferred embodiment utilizing the benefits of a cPP storage unit 110. In closed position, a disc (partially shown as 116) resides within the unit 110, including promotional material 114 present within the unit 110 as well. A cut-out portion 120 thus permits viewing of an holographic image on the surface of the disc 116 for aesthetic, identification, or other desired purpose.

Thus, a new optical disc storage unit is provided, produced from at least a majority of clarified polypropylene, permitting the complete internal placement of any informational literature accompanying such a disc such that said literature is viewable and readable at any location through the walls and spine portion of such a storage unit when closed. This, in turn, permits a reduction in cost for informational literature printing as a larger area of printable space is accorded as well as the ability to remove the need for an outside jacket to hold title, cover, and other informational items. This inventive configuration also provides a maximum utilization of space for the enjoyment and aesthetic pleasure of the consumer as well with regards to the promotional material, or other like supplied articles accompanying the commercialized disc.

There are, of course, many alternative embodiments and modifications of the present invention which are intended to be included within the spirit and scope of the following claims.

We claim:

1. A transparent polypropylene-containing storage unit housing informational literature, the storage unit having a first side comprising a first substantially transparent wall having an interior surface and a second side comprising a second substantially transparent wall having an interior surface, said sides being separated and integrally connected by a spine portion, wherein a first living hinge connects said first wall with said spine portion to define a first hinge line and a second living hinge connects said second wall with said spine portion to define a second hinge line, said walls and said spine portion being integrally formed of one continuous piece of polypropylene material, said promotional literature being a single sheet and provided within said storage unit in a position that is in overlying contacting relation with at least a portion of the first and second hinge lines and at least a portion of the interior surfaces of said first and said second substantially transparent walls adjacent the hinge lines and with the interior of said spine portion, said spine portion having a top end, a bottom end, and a middle area between said top end and said bottom end, wherein at least said middle area of said spine portion consists essentially of clarified polypropylene, said storage unit being adapted such that said informational literature is readily visible through said first and second substantially transparent walls and through said middle area of said spine portion of said storage unit, said storage unit further comprising at least one support member adapted to releasably hold an optical disc such that said disc is normally disposed within said storage unit in overlying relation to at least a portion of said informational literature, and wherein said support member is hingedly connected to the storage unit such that the support member and disc may be rotated upwardly and away from an underlying portion of the informational literature, whereby said underlying portion of informational literature is visible without obstruction by said disc.

2. A transparent polypropylene-containing storage unit housing informational literature, the storage unit having a first side comprising a first substantially transparent wall having an interior surface and a second side comprising a second substantially transparent wall having an interior surface, said sides being separated and integrally connected by a spine portion, wherein a first living hinge connects said first wall with said spine portion to define a first hinge line and a second living hinge connects said second wall with said spine portion to define a second hinge line, said walls and said spine portion being integrally formed of one continuous piece of polypropylene material, said promotional literature being a single sheet and provided within said storage unit in a position that is in overlying contacting relation with the interior surfaces of said first and said second substantially transparent walls adjacent the hinge lines and with the interior of said spine portion, said spine portion having a top end, a bottom end, and a middle area between said top end and said bottom end, wherein at least said middle area of said spine portion consists essentially of clarified polypropylene, said storage unit being adapted such that said informational literature is readily visible through said first and second substantially transparent walls and through said middle area of said spine portion of said storage unit and wherein the storage unit further includes at least one peripheral edge, said edge including at least one holding means for releasably securing an optical disc, said at least one holding means being either permanently or temporarily attached to said at least one peripheral edge via a hinge, wherein said optical disc may be maneuvered outside of said storage unit while simultaneously being held within said holding means which in turn remains attached to said at least one peripheral edge of said storage unit.

* * * * *